US012574148B2

(12) United States Patent
Zhang et al.

(10) Patent No.: US 12,574,148 B2
(45) Date of Patent: Mar. 10, 2026

(54) METHOD AND APPARATUS FOR REDUNDANT TRANSMISSION TO SUPPORT HIGH DATA TRANSMISSION RELIABILITY

(71) Applicant: LENOVO (BEIJING) LIMITED, Beijing (CN)

(72) Inventors: Zhuoyun Zhang, Beijing (CN); Genadi Velev, Darmstadt (DE); Dimitrios Karampatsis, Middlesex (GB); Chenxi Zhu, Fairfax, VA (US)

(73) Assignee: Lenovo (Beijing) Limited, Beijing (CN)

( * ) Notice: Subject to any disclaimer, the term of this patent is extended or adjusted under 35 U.S.C. 154(b) by 11 days.

(21) Appl. No.: 17/057,585

(22) PCT Filed: May 22, 2018

(86) PCT No.: PCT/CN2018/087904
§ 371 (c)(1),
(2) Date: Nov. 20, 2020

(87) PCT Pub. No.: WO2019/222925
PCT Pub. Date: Nov. 28, 2019

(65) Prior Publication Data
US 2021/0211233 A1     Jul. 8, 2021

(51) Int. Cl.
*H04L 1/08*     (2006.01)
*H04L 1/22*     (2006.01)
(Continued)

(52) U.S. Cl.
CPC .................. *H04L 1/08* (2013.01); *H04L 1/22* (2013.01); *H04W 72/21* (2023.01); *H04W 72/23* (2023.01); *H04W 76/12* (2018.02); *H04W 80/10* (2013.01)

(58) Field of Classification Search
None
See application file for complete search history.

(56) References Cited

U.S. PATENT DOCUMENTS

2017/0366618 A1* 12/2017 Vrzic ................... H04L 67/148
2018/0176325 A1* 6/2018 Liang ..................... H04L 65/80
(Continued)

FOREIGN PATENT DOCUMENTS

CN     107426771 A     12/2017
WO     2017182927 A1     10/2017
WO     2017215670 A1     12/2017

OTHER PUBLICATIONS

Nokia, "Architecture and Protocols: Connectivity Service Solution for IAB", R3-182842, Nokia, Nokia Shanghai Bell, 3GPP TSG-RAN WG3 Meeting #100, May 21-25, 2018, pp. 1-10.
(Continued)

*Primary Examiner* — Clemence S Han
(74) *Attorney, Agent, or Firm* — Kunzler Needham & Hilton

(57) ABSTRACT

The present disclosure is related to a method and apparatus for redundant transmission to support high data transmission reliability. A method for redundant transmission to support high data transmission reliability includes deciding to add a redundant entity for a first User Plane Function (UPF) entity, selecting a second UPF entity as the redundant entity of the first UPF entity, indicating an Uplink Replication (UL RP) function on a third network entity, and indicating Downlink Replication (DL RP) function on a fourth network entity or Data Network (DN). The present disclosure supports high data transmission reliability by redundant transmission wireless communication system.

16 Claims, 5 Drawing Sheets

(51) Int. Cl.

| | |
|---|---|
| *H04W 72/21* | (2023.01) |
| *H04W 72/23* | (2023.01) |
| *H04W 76/12* | (2018.01) |
| *H04W 80/10* | (2009.01) |

(56) References Cited

U.S. PATENT DOCUMENTS

| | | | | |
|---|---|---|---|---|
| 2018/0279180 A1* | 9/2018 | Lee | ................... | H04W 36/0019 |
| 2018/0367288 A1* | 12/2018 | Vrzic | .................... | H04W 76/12 |
| 2019/0215724 A1* | 7/2019 | Talebi Fard | .......... | H04W 48/16 |
| 2019/0215731 A1 | 7/2019 | Qiao et al. | | |
| 2019/0268815 A1* | 8/2019 | Zhu | ................... | H04W 36/0016 |
| 2020/0154390 A1* | 5/2020 | Kim | ........................ | H04W 8/26 |
| 2020/0260457 A1* | 8/2020 | Sun | ........................ | H04W 92/02 |
| 2020/0374946 A1* | 11/2020 | Bedekar | ................ | H04W 76/12 |
| 2021/0037425 A1* | 2/2021 | Kainulainen | ......... | H04W 76/27 |

OTHER PUBLICATIONS

PCT/CN2018/087904, "International Search Report and the Written Opinion of the International Search Authority" ISA/CN, State Intellectual Property Office of the P.R. China, Jan. 30, 2019, pp. 1-7.

U.S. Appl. No. 18/599,777, "Office Action Summary", USPTO, Apr. 4, 2025, pp. 1-15.

\* cited by examiner

Uplink data transmission

Downlink data transmission

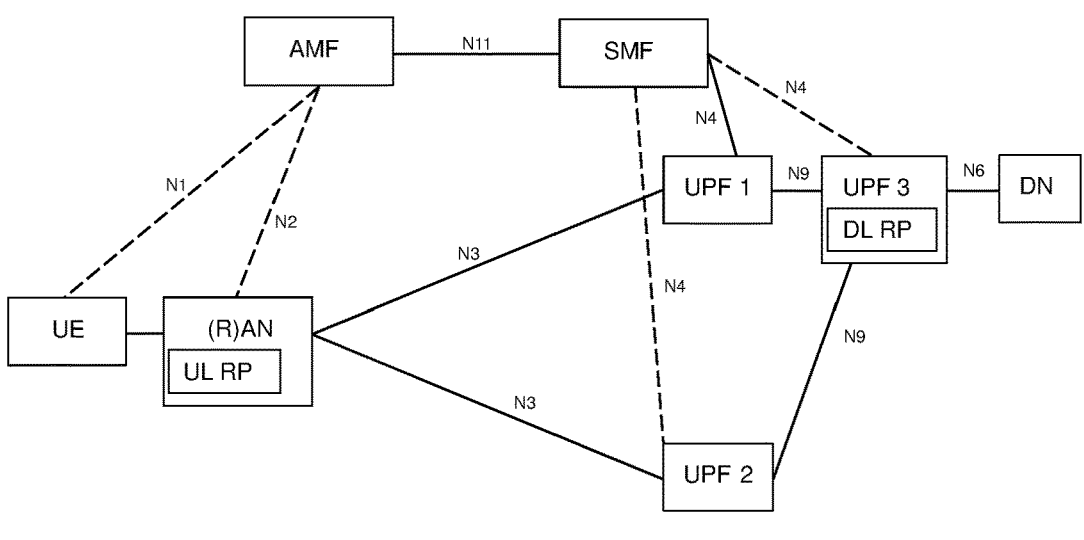
FIG. 10
1100
| 1101 | DECIDING TO ADD A REDUNDANT ENTITY FOR A FIRST UPF ENTITY |
|---|---|
| 1102 | SELECTING A SECOND UPF ENTITY AS THE REDUNDANT ENTITY OF THE FIRST UPF ENTITY |
| 1103 | INDICATING DOWNLINK REPLICATION FUNCTION ON A NETWORK ENTITY OR DN |
FIG. 11
1200
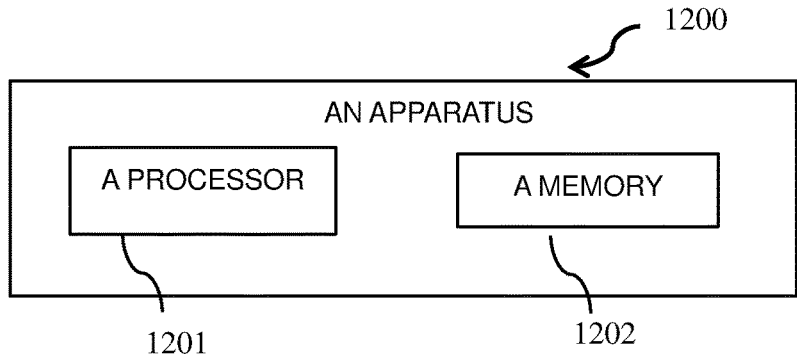
FIG. 12

METHOD AND APPARATUS FOR REDUNDANT TRANSMISSION TO SUPPORT HIGH DATA TRANSMISSION RELIABILITY

TECHNICAL FIELD

The present disclosure generally relates to wireless communication technology, and more specifically relates to a method and apparatus for redundant transmission to support high data transmission reliability.

BACKGROUND OF THE INVENTION

In wireless communication technology, during data transmission, when a network entity serving a data session or data flow is going to be unreliable, or a network entity serving a data session or data flow is already an unreliable entity, the communication quality on a data link including the network entity will be reduced, and data transmission reliability of the data link including the network entity cannot be ensured.

However, no detail of a solution of supporting high data transmission reliability under an application scenario of a mobile communication system is disclosed. Given the above, a solution of supporting high data transmission reliability by redundant transmission under an application scenario of a mobile communication system is desirable.

BRIEF SUMMARY OF THE INVENTION

One objective of the embodiments of the present disclosure is to provide a solution of supporting high data transmission reliability by redundant transmission under an application scenario of a mobile communication system.

In accordance with some embodiments of the present disclosure, a method includes deciding to add a redundant entity for a first User Plane Function (UPF) entity, selecting a second UPF entity as the redundant entity of the first UPF entity, and indicating an Uplink Replication (UL RP) function on a third network entity.

In accordance with some embodiments of the present disclosure, a method includes deciding to add a redundant entity for a first User Plane Function (UPF) entity, selecting a second UPF entity as the redundant entity of the first UPF entity, and indicating a Downlink Replication (DL RP) function on a fourth network entity.

In accordance with some embodiments of the present disclosure, a method includes deciding to modify a redundant transmission link for a first User Plane Function (UPF) entity, and removing an Uplink Replication (UL RP) function from a third network entity.

In accordance with some embodiments of the present disclosure, an apparatus includes a processor and a memory coupled to the processor. The processor is configured to decide to add a redundant entity for a first User Plane Function (UPF) entity, select a second UPF entity as the redundant entity of the first UPF entity, and indicate an Uplink Replication (UL RP) function on a third network entity.

In accordance with some embodiments of the present disclosure, an apparatus includes a processor and a memory coupled to the processor. The processor is configured to decide to add a redundant entity for a first User Plane Function (UPF) entity, select a second UPF entity as the redundant entity of the first UPF entity, and indicate a Downlink Replication (DL RP) function on a fourth network entity.

In accordance with some embodiments of the present disclosure, an apparatus includes a processor and a memory coupled to the processor. The processor is configured to decide to modify a redundant transmission link for a first User Plane Function (UPF) entity, remove an Uplink Replication (UL RP) function from a third network entity, and remove an Downlink Replication (DL RP) function from a fourth network entity.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended figures. These figures depict only embodiments of the present disclosure and are not therefore to be considered as limiting of its scope.

FIG. 10 illustrates a block diagram of an enhanced mobile network architecture to support redundant transmission according to some embodiments of the present disclosure.

FIG. 11 illustrates a flowchart demonstrating a method of redundant transmission to support high data transmission reliability according to some embodiments of the present disclosure.

FIG. 12 illustrates a block diagram of an apparatus according to some embodiments of the present disclosure.

DETAILED DESCRIPTION OF THE INVENTION

The detailed description of the appended figures is intended as a description of the currently preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Embodiments of the present disclosure provide methods and apparatus for redundant transmission to support high data transmission reliability. To facilitate understanding, embodiments of the present disclosure are provided under specific network architecture and service scenarios, such as 3GPP LTE (Long Term Evolution) Release 8, 3GPP 5G URLLC, 3GPP 5G eMBB, 3GPP 5G mMTC, 3GPP 5G NR (new radio), and onwards. Persons skilled in the art are well aware that, with developments of network architecture and new service scenarios, the embodiments in the present disclosure are also applicable to similar technical problems.

Ultra-reliable low latency communication (URLLC), Enhanced Mobile Broadband (eMBB), and Massive Machine Type Communication (mMTC) are three application scenarios supporting a 3rd Generation Partnership Project (3GPP) 5G system. Under a URLLC application scenario of a 3GPP 5G system, ensuring high data transmission reliability is especially important for the services.

In System Architecture for the 5G System (SA 5G), for example, Stage 1 of SA 5G (SA1 5G), Stage 2 of SA 5G (SA2 5G), and etc., there are issues regarding how to support high data transmission reliability. The present disclosure may solve several issues on supporting high data transmission reliability by redundant data transmission.

For instance, issues solved by the present disclosure include: how to establish, modify, or release multiple redundant data tunnels or multiple redundant data transmission links on standard interfaces (for example, interfaces N3, N6, or N9 in SA2 5G); how to make a decision on whether enabling redundant data transmission for a specific Quality of Service (QoS) flow or not; and how to replicate, when necessary, a data packet in a remote unit, a terminal, an User Equipment (UE), a (Radio) Access Network ((R)AN), a base station, an User Plane Function (UPF) entity, or other types of network entity or node.

In an implementation, for a packet data Unit (PDU) session for an UE or a terminal in the 3GPP 5G system, if any user plane entity or node serving the PDU session in the network architecture is unreliable or will be unreliable, the high reliability requirement of certain QoS flows of the UE may not be guaranteed.

Figure 1:
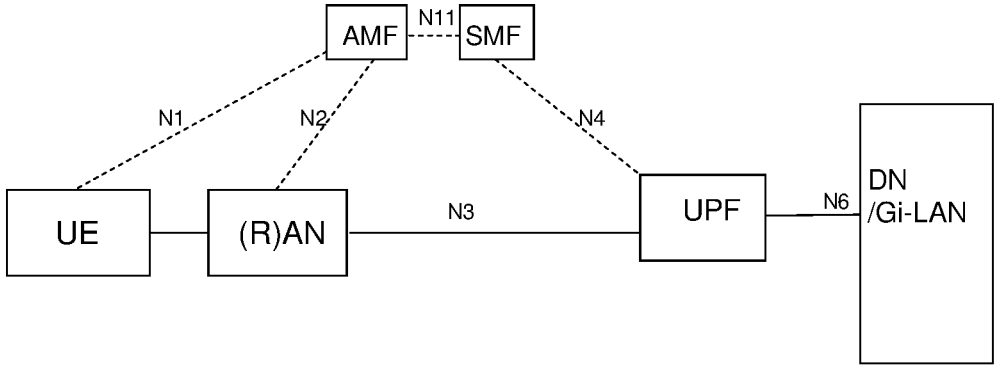
FIG. 1 illustrates a block diagram of mobile network architecture including a User Plane Function (UPF) entity according to some embodiments of the present disclosure.

FIG. 1 illustrates a block diagram of mobile network architecture including a User Plane Function (UPF) entity according to some embodiments of the present disclosure.

The mobile network architecture as shown in FIG. 1 includes Access and Mobility Management Function (AMF) entity, Session Management Function (SMF) entity, an UE, a (R)AN, an UPF entity, and Data Network (DN)/Gi Local Access Network (Gi-LAN). Persons skilled in the art will know that the number of each type of entity or node in the mobile network architecture as shown in FIG. 1 may vary. For example, the mobile network architecture as shown in FIG. 1 may include a plurality of UEs and/or UPF entities.

In the embodiment illustrated in FIG. 1, for a PDU session in the 3GPP 5G system, once the UPF entity serving this PDU session is an unreliable node or will be unreliable, the network entity in the control plane may decide to add a redundant transmission tunnel or link for the UPF entity, to ensure high data transmission reliability by redundant transmission. According to an implementation of the present disclosure, the SMF entity decides to add another transmission entity as a redundant entity for UPF entity.

The embodiment illustrated in FIG. 1 may be applied under a certain application scenario of a 3GPP 5G system. For instance, under an URLLC scenario, for a PDU session in an URLLC slice, a redundant transmission tunnel or link is established for the current UPF entity, to enhance data transmission reliability.

In a certain embodiment of the present disclosure, entities in a mobile network architecture may work under SA2 5G URLLC standards, and the entities communication with each other via standard interfaces. For example, as shown in FIG. 1, the AMF entity communicates with the SMF entity via N11 interface, the AMF entity communicates with an UE via N1 interface, the AMF entity communicates with a (R)AN via N2 interface, the SMF entity communicates with an UPF entity via N4 interface, a (R)AN communicates with the UPF entity via N3 interface, and the UPF entity communicates with DN/Gi-LAN via N6 interface.

The present disclosure introduces two functions for redundant data transmission. In some embodiments, one is Uplink Replication (UL RP) function, and the other is Downlink Replication (DL RP) function. The UL RP function includes, but is not limited to, replicating uplink traffic or data packets, eliminating replications of downlink traffic or data packets, and/or applying a redundant transmission rule(s) defined or specified by a control plane entity of a network architecture. The DL RP function includes, but is not limited to, replicating downlink traffic or data packets, eliminating replications of uplink traffic or data packets, and/or applying a redundant transmission rule(s) defined or specified by a control plane entity of a network architecture.

Alternatively, the Uplink Replication function may be named as ULR or UL-R function, and the Downlink Replication function may be named as DLR or DL-R function.

In particular, the UL RP and DL RP functions may be implemented on any network entity or Data Network (DN). For example, the UL RP function is supported by a (R)AN, an UPF entity, or an UE, and the DL RP function is supported by an UPF entity, Data Network (DN), or Gi-LAN.

Operations or actions of UL RP and DL RP functions described above are applicable to all embodiments in the present disclosure. After implementing/performing UL RP and/or DL RP functions on one or more redundant transmission tunnels and links for an unreliable entity, higher data transmission reliability is ensured.

Figure 2:
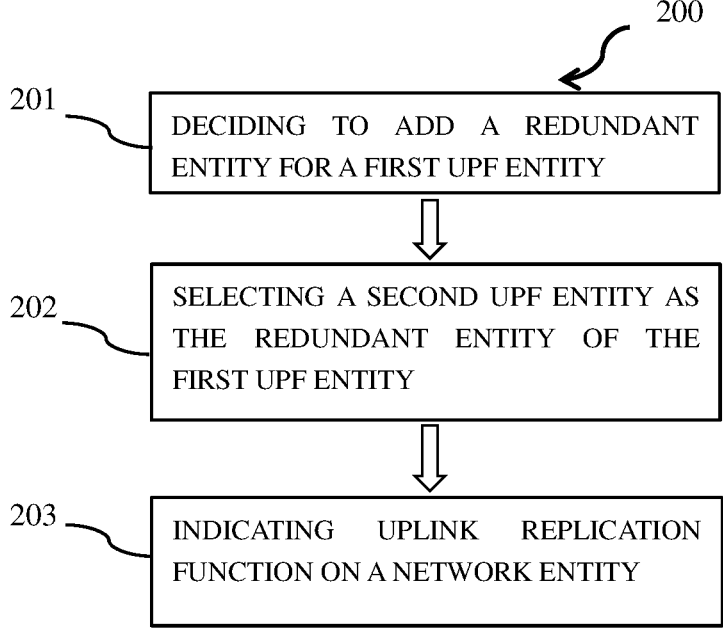
FIG. 2 illustrates a flowchart demonstrating a method of redundant transmission to support high data transmission reliability according to some embodiments of the present disclosure.

FIG. 2 illustrates a flowchart demonstrating a method of redundant transmission to support high data transmission reliability according to some embodiments of the present disclosure. In some embodiments, the method can be performed by SMF entity.

In step 201 of FIG. 2, adding a redundant entity for a first UPF entity is decided. In an example, the SMF entity decides to add a redundant entity for a first UPF entity.

In step 202 of FIG. 2, a second UPF entity is selected as the redundant entity of the first UPF entity. In an example, the second UPF entity is selected during a PDU session establishment procedure. In another example, the second UPF entity is selected after completing a PDU session establishment procedure. In an implementation, the SMF entity selects a second UPF from multiple entities within a network as the redundant entity of the first UPF entity.

In step 203 of FIG. 2, Uplink Replication (UL RP) function is indicated on a network entity. In an example, the network entity is an UPF entity. In a further example, the network entity is a (R)AN entity or an UE. In an implementation, the SMF entity instructs or indicates a network entity to perform UL RP function.

According to some embodiments of the present disclosure, data tunnel information related to the UL RP entity is provided to the first UPF entity and its redundant entity. For example, Core Network (CN) Tunnel information related to the network entity with the UL RP function is sent to both the first UPF entity and the selected second UPF entity. For another example, Core Network (CN) Tunnel information related to the network entity with the UL RP function is also sent to (R)AN.

According to some embodiments of the present disclosure, data tunnel information related to the first UPF entity and its redundant entity is provided to the network entity with the UL RP function. For example, Core Network (CN) Tunnel information related to the first UPF entity is sent to the network entity with the UL RP function, and Core Network (CN) Tunnel information related to the selected second UPF entity is also sent to the network entity with the UL RP function. For another example, Access Network (AN) Tunnel information related to (R)AN is sent to the network entity with the UL RP function.

According to some embodiments of the present disclosure, one or more second UPF entities are selected as the redundant entity of the first UPF entity. In response to selecting a plurality of UPF entities as the redundant entity of the first UPF entity, multiple redundant transmission tunnels and links are established for the first UPF entity. In this case, CN Tunnel information related to all selected second UPF entities and/or the first UPF entity is sent to the network entity with UL RP function. Similarly, CN Tunnel information related to the network entity with the UL RP function is sent to all selected second UPF entities and the first UPF entity. Accordingly, the network entity with UL RP function makes multiple replications of data packets of a QoS flow based on the number of selected second UPFs.

According to some embodiments of the present disclosure, the network entity replicates one or more copies of uplink data packets of a QoS flow based on the number of the redundant UPF entities. For example, in response to selecting three UPF entities from multiple UPF entities in the network and adding these three UPF entities as the redundant entity of an unreliable UPF entity, the network entity with the UL RP function replicates uplink data packets of a QoS flow into four copies, and then sends the four copies of uplink data packets to all the three redundant UPF entities and the unreliable UPF entity, to improve data transmission reliability.

According to some embodiments of the present disclosure, the method of redundant transmission to support high data transmission reliability further comprises indicating DL RP function on another network entity or Data Network (DN). The another network entity may be an UPF entity, or Gi-LAN, or a combination thereof. In an implementation, Gi-LAN is indicated or configured to perform DL RP function, while the DN does not support or perform the DL RP function.

In the embodiment of FIG. 2, after selecting a second UPF entity as the redundant entity of the first UPF entity and indicating the UL RP function on a network entity, the network entity replicates uplink data packets and sends the replicated uplink data packets to both the first UPF entity and the second UPF entity. For instance, the network entity replicates uplink data packets into two copies and sends these two copies of uplink data packets to both the first UPF entity and the second UPF entity.

According to some embodiments of the present disclosure, a network entity supporting UL RP function may be controlled by the SMF to support traffic measurement for charging, traffic replication for Lawful interception (LI), or bit rate enforcement (Session-Aggregated Maximum Bitrate (AMBR) per PDU Session), or a combination thereof.

In an implementation, the method of redundant transmission to support high data transmission reliability further comprises transmitting a redundant transmission rule(s) to the UL RP/DL RP entity. The redundant transmission rule(s) defines behaviors, operations, or actions of UL RP and/or DL RP functions. For example, the redundant transmission rule(s) may define: the number of copies of data packets that need to be replicated, a duration of available time of a redundant entity, which Quality of Service (QoS) flow in a PDU session needs a redundant transmission, or which data packet for a QoS flow needs to be replicated, or a combination thereof. Generally, the number of copies of data packets that need to be replicated is related to the number of redundant transmission links added to the network architecture.

A duration of available time of a redundant entity represents a length of specific available time of an entity which is selected and added as the redundant entity for an unreliable entity. After the specific available time, this selected entity will no longer act or operate as the redundant entity for the unreliable entity, and the redundant link or tunnel with this selected entity may be released or modified.

In an implementation, if a redundant transmission rule(s) is transmitted and applied to a UL RP/DL RP entity, the UL RP/DL RP entity replicates and transmits data packets according to the redundant transmission rule(s).

Alternatively, a UL RP/DL RP entity may replicate and transmit data packets according to other rule(s)s, without using the redundant transmission rule(s). For example, a UL RP/DL RP entity replicates all QoS flows in a PDU session for redundant data transmission. In another example, a UL RP/DL RP entity merely replicates a specific QoS flow in a PDU session, according to information related to an identifier (ID) of the specific QoS flow in the PDU session, for redundant data transmission.

In an implementation, the same redundant transmission rule(s) is transmitted to both a UL RP entity and a DL RP entity. Accordingly, the UL RP and DL RP entities act or operate according to the same redundant transmission rule(s). For instance, a redundant transmission rule(s) associated with the same PDU session for the same UE are sent to both a UL RP entity and a DL RP entity in a mobile network architecture.

In an implementation, the SMF entity locally generates a redundant transmission rule(s) and sends the redundant transmission rule(s) to a network entity, to configure or apply the redundant transmission rule(s) on the network entity. In another implementation, Policy Control Function (PCF) entity sends the redundant transmission rule(s) to the SMF entity, and the SMF entity sends the received redundant transmission rule(s) to a network entity, to configure or apply the redundant transmission rule(s) on the network entity.

The SMF entity may send updated redundant transmission rule(s) to a network entity, which is configured the redundant transmission rule(s). In one example, the SMF entity itself updates the redundant transmission rule(s) and sends the updated redundant transmission rule(s). In another example, the PCF entity updates the redundant transmission rule(s) and sends the updated redundant transmission rule(s) to the SMF entity, and then the SMF entity transmits the received updated redundant transmission rule(s) to a network entity.

In an implementation, DN performs DL RP function, and Network Exposure Function (NEF) entity or PCF entity transmits a redundant transmission rule(s) to the Application Function (AF) entity. In this case, DN supports the redundant transmission function and applies the redundant transmission rule(s).

In another implementation, a redundant transmission rule(s) is transmitted to Gi-LAN with DL RP function. In this case, the Gi-LAN supports the redundant transmission function and applies the redundant transmission rule(s).

In a further implementation, a redundant transmission rule(s) is transmitted to UPF entity with UL RP/DL RP function. In this case, this UPF entity supports the redundant transmission function and applies the redundant transmission rule(s).

Figure 3:
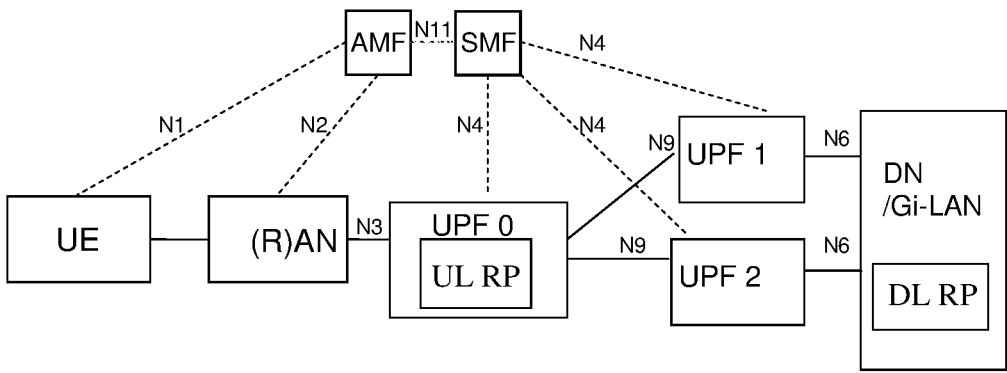
FIG. 3 illustrates a block diagram of an enhanced mobile network architecture to support redundant transmission according to some embodiments of the present disclosure.

FIG. 3 illustrates a block diagram of an enhanced mobile network architecture to support redundant transmission according to some embodiments of the present disclosure. The enhanced mobile network architecture as shown in FIG. 3 includes AMF entity, SMF entity, an UE, a (R)AN, three UPF entities (i.e., UPF 0, UPF 1, and UPF 2), and DN/Gi-LAN. Persons skilled in the art will know that the number of each type of entity or node in the enhanced mobile network architecture may vary and is not limited.

Similar to the embodiment of FIG. 1, entities in the enhanced mobile network architecture in FIG. 3 may work under SA2 5G URLLC standards, and the entities communication with each other via standard interfaces. In particular, FIG. 3 shows standard interfaces, N1, N2, N3, N4, N6, and N11 between entities in the enhanced mobile network architecture, which are the same as those in FIG. 1. In addition, FIG. 3 shows that UPF 0 entity communicates with UPF 1 and UPF 2 via N9 standard interface.

According to the embodiment of FIG. 3, in order to support data transmission reliability, UPF 2 entity is selected and added as a redundant entity for UPF 1 entity, and UPF 1 and UPF 2 entities correspond to the same PDU session for the same UE. UPF 0 entity is added into the mobile network architecture for implementing a redundant transmission function, such as, UL RP function. DN or Gi-LAN is configured to implement a redundant transmission function, such as, DL RP function.

In some embodiments of the present disclosure, if UPF 1 and UPF 2 entities correspond to the same PDU session for the same UE, DN supporting URLLC services considers UPF 1 and UPF 2 entities as redundant transmission nodes. Under this circumstance, in uplink data transmission, the DN with a redundant transmission function, such as, the DL RP function, determines whether uplink data packets transmitted from both UPF 1 and UPF 2 entities are identical and eliminates the redundant data for this PDU session or QoS flow by merging the identical data packets. In downlink data transmission, the DN with a redundant transmission function, such as, the DL RP function, replicates the downlink data for this PDU session into two copies and sends them to both UPF 1 and UPF 2 entities.

In the embodiment of FIG. 3, in uplink data tunnels, after the UL RP function is indicated or instructed to the UPF 0 entity, the UPF 0 entity replicates uplink packets coming from the (R)AN into two copies, and then sends these two copies of the uplink packets, via N9 interfaces, to both UPF 1 and UPF 2 entities. The UPF 1 and UPF 2 entities respectively transmit the received data packets to the next entity in the network or the DN.

As shown in FIG. 3, both UPF 1 and UPF 2 entities are connected to DN or Gi-LAN. Accordingly, the DN or Gi-LAN will receive two copies of uplink packets from both the UPF 1 and UPF 2 entities via N6 interface, and these two copies of uplink packets are identical. In this embodiment, after indicating or instructing the DL RP function to the DN or Gi-LAN, the DN or Gi-LAN may eliminate replications of uplink packets by merging identical copies of uplink packets into one copy of uplink packets. For example, the DN or Gi-LAN determines whether two copies of uplink data packets transmitted from the UPF 1 and UPF 2 entities are identical; and in response to receiving identical copies of uplink data packets, the DN or Gi-LAN eliminates redundant uplink data packets.

In the embodiment of FIG. 3, the UL RP function is indicated to the UPF 0 entity, the DL RP function is indicated to the DN or Gi-LAN, and the UPF 2 entity is a redundant entity for the UPF 1 entity. Accordingly, in downlink data tunnels, the DN or Gi-LAN replicates downlink data packets into two copies, and then sends these two copies of the downlink packets, via N6 interfaces, to both the UPF 1 and UPF 2 entities, for further data transmission. Both the UPF 1 and UPF 2 entities transmit the downlink packets which they receive to the UPF 0 entity via N9 interfaces. In response to receiving two copies of the downlink packets from the UPF 1 and UPF 2 entities, the UPF 0 entity eliminates replications of downlink packets by merging two identical copies of downlink packets into one copy of downlink packets. After that, the UPF 0 entity sends one copy of downlink packets to the (R)AN via the N6 interface.

Figure 4:
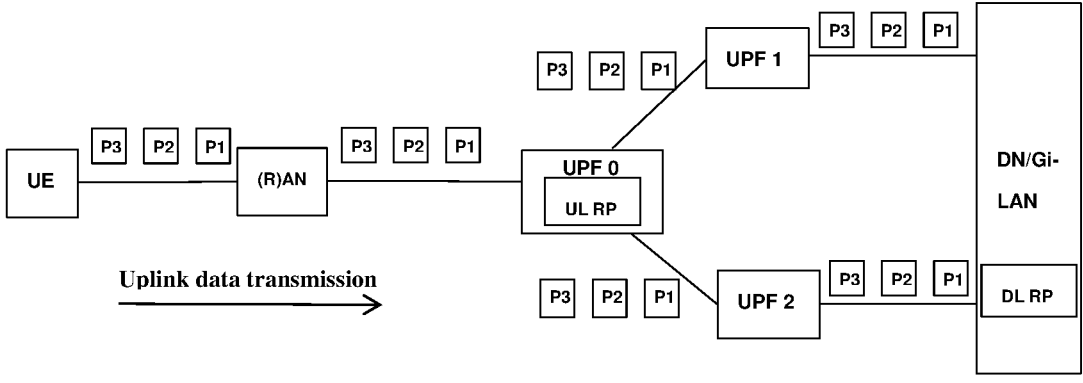
FIG. 4 illustrates a drawing of processing an uplink data flow using Uplink Replication (UL RP) and Downlink Replication (DL RP) functions according to some embodiments of the present disclosure.

FIG. 4 illustrates a drawing of processing an uplink data flow using UL RP and DL RP functions according to some embodiments of the present disclosure. As shown in FIG. 4, in the uplink data transmission, before adding the redundant node UPF 2, three packets in the same QoS flow of the PDU session for the same UE (i.e., P1, P2, and P3) are transmitted in sequence from the UE, through (R)AN and UPF 0, and UPF 1 entities, and P1, P2, and P3 finally arrive at DN or Gi-LAN in a mobile network architecture.

In particular, after adding the redundant node UPF 2, the uplink data packets, P1, P2, and P3, are transmitted from (R)AN to the UPF 0 entity, and the UPF 0 entity is indicated or configured to perform UL RP function. The UPF 0 entity replicates P1, P2, and P3 into two copies and sends them to both UPF 1 and UPF 2 entities. The UPF 1 and UPF 2 entities respectively transmit P1, P2, and P3, which they receive from the UPF 0 entity, to the DN or Gi-LAN. After receiving uplink data packets from the UPF 1 and UPF 2 entities, the DN or Gi-LAN eliminates replications of uplink packets by merging two identical copies of P1, P2, and P3 into one copy according to the DL RP function indicated on the DN or Gi-LAN.

In some embodiments, the DN or Gi-LAN determines whether P1 transmitted from the UPF 1 entity and P1 transmitted from the UPF 2 entity are identical. In response to receiving two identical copies of P1 from the UPF 1 and UPF 2 entities, the DN or Gi-LAN reserves one copy of P1 while discards the other copy of P1.

In a similar way, the DN or Gi-LAN determines whether P2/P3 transmitted from the UPF 1 entity and P2/P3 transmitted from the UPF 2 entity are identical. In response to receiving two identical copies of P2/P3 from the UPF 1 and UPF 2 entities, the DN or Gi-LAN reserves one copy of P2/P3 while discards the other copy of P2/P3.

Figure 5:
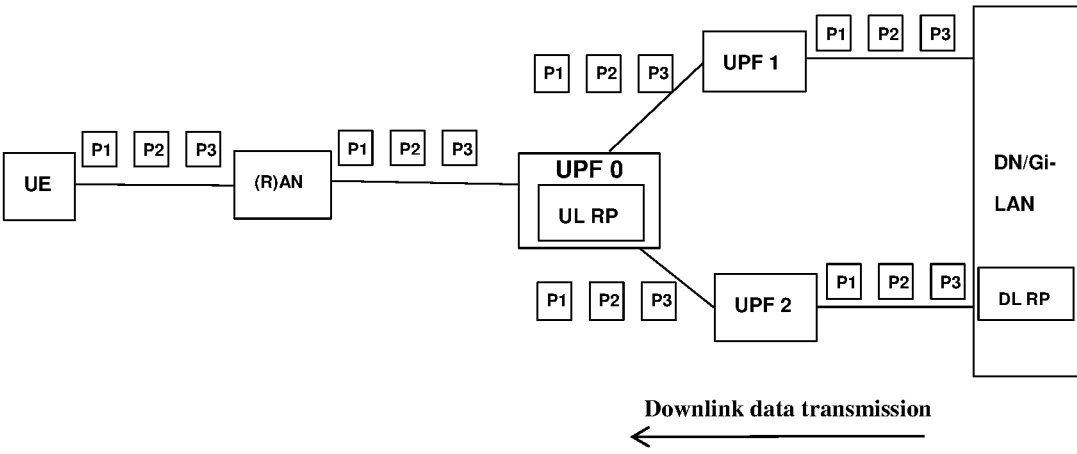
FIG. 5 illustrates a drawing of processing a downlink data flow using UL RP and DL RP functions according to some embodiments of the present disclosure.

FIG. 5 illustrates a drawing of processing a downlink data flow using UL RP and DL RP functions according to some embodiments of the present disclosure. As shown in FIG. 5, in the downlink data transmission, before adding the redundant node UPF 2, three packets in the same QoS flow of the PDU session for the same UE (i.e., P1, P2, and P3) are transmitted in sequence from DN/Gi-LAN, through UPF 1, and UPF 0 entities, and (R)AN, and P1, P2, and P3 finally arrive at the UE in the mobile network architecture.

In particular, after adding the redundant node UPF 2, in downlink data transmission, the DN or Gi-LAN with DL RP function replicates P1, P2, and P3 into two copies and sends them to both UPF 1 and UPF 2 entities. The UPF 1 and UPF 2 entities respectively transmit P1, P2, and P3, which they receive from the DN or Gi-LAN, to the UPF 0 entity. After receiving downlink data packets from both the UPF 1 and UPF 2 entities, the UPF 0 entity eliminates replications of downlink data packets by merging two identical copies of P1, P2, and P3 into one copy according to the UL RP function indicated on the UPF 0 entity.

In some embodiments, the UPF 0 entity determines whether P1 transmitted from the UPF 1 entity and P1 transmitted from the UPF 2 entity are identical. In response to receiving two identical copies of P1 from the UPF 1 and UPF 2 entities, the UPF 0 entity reserves one copy of P1 while discards the other copy of P1.

In a similar way, the UPF 0 entity determines whether P2/P3 transmitted from the UPF 1 entity and P2/P3 transmitted from the UPF 2 entity are identical. In response to receiving two identical copies of P2/P3 from the UPF 1 and UPF 2 entities, the UPF 0 entity reserves one copy of P2/P3 while discards the other copy of P2/P3.

Figure 6:
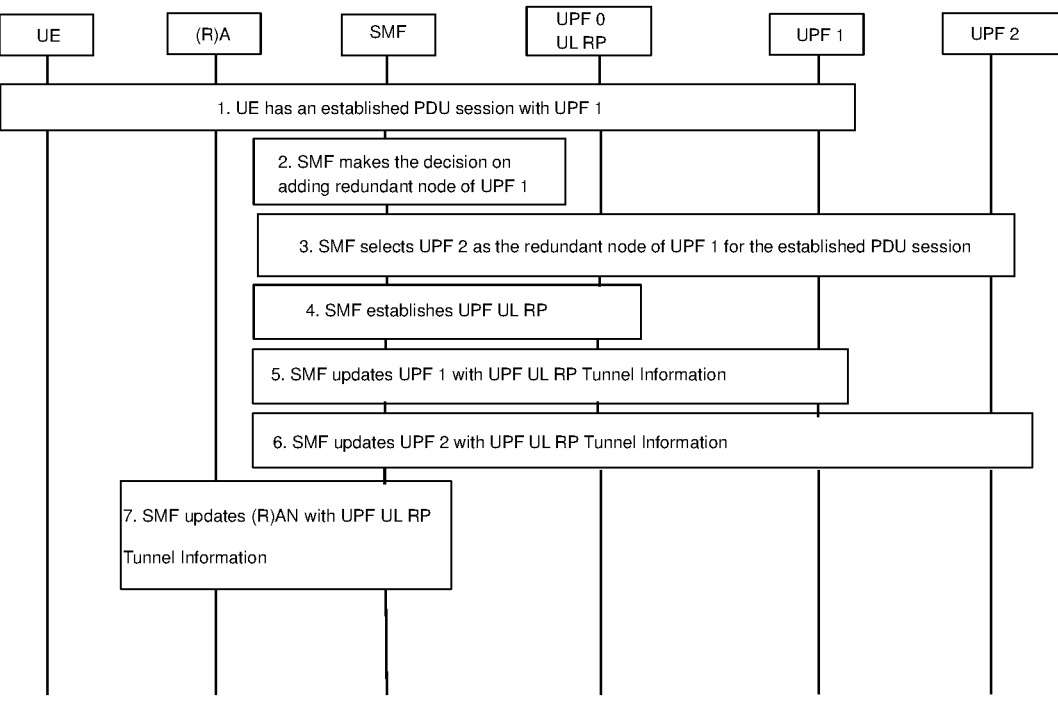
FIG. 6 illustrates a procedure for indicating an UL RP function on an UPF entity according to some embodiments of the present disclosure.

FIG. 6 illustrates a procedure for indicating UL RP function on an UPF entity according to some embodiments of the present disclosure. This embodiment illustrates a procedure for indicating UL RP function on an UPF entity after completing a PDU session establishment procedure.

Alternatively, a procedure for indicating UL RP function on an UPF entity may be performed during a PDU session establishment procedure.

In the embodiment of FIG. 6, an UE has an established PDU session associated with URLLC services with an UPF 1 entity, and the User Plane of this PDU Session involves at least the (R)AN and the UPF 1 entity. In response to the UPF 1 entity being an unreliable node, the SMF entity decides to add a redundant node for the UPF 1 entity. The SMF selects an UPF 2 entity as the redundant node of the UPF 1 entity of the PDU session. The SMF entity selects an UPF 0 entity and establishes UL RP function for the PDU session on the UPF 0 entity via N4 standard interface. In some embodiments, the UPF 0 entity already exists between UPF 1 entity and (R)AN before adding the redundant transmission node UPF 2, and the SMF indicates the existing UPF 0 entity as the UL RP entity.

During establishing the UL RP function for the PDU session on the UPF 0 entity, if the UPF 0 entity is a newly added UPF entity for redundant transmission, the SMF entity provides CN Tunnel information related to the UPF 1 entity and CN Tunnel information related to the UPF 2 entity to the UPF 0 entity, and provides the CN Tunnel information related to the UPF 0 entity to the UPF 1 entity and UPF 2 entity; and the SMF entity provides AN Tunnel information related to (R)AN to the UPF 0 entity, and also provides the CN Tunnel information related to the UPF 0 entity to (R)AN. If UPF 0 already exists between UPF 1 entity and (R)AN before adding the redundant transmission node UPF 2, the SMF entity only provides the CN Tunnel information related to the UPF 2 entity to the UPF 0 entity.

After establishing the UL RP function for the PDU session on the UFP 0 entity, the UPF 0 entity replicates the uplink data into two copies and sends the replicated uplink data to both the UPF 1 and UPF 2 entities.

In addition, if the UPF 0 entity is a newly added UPF entity for redundant transmission, the SMF updates (R)AN using N2 Session Management (SM) information via N11 standard interface. The SMF entity provides new CN Tunnel information related to the UPF 0 entity to the (R)AN. The UPF 0 entity with the UL RP function checks downlink packets, determines whether the downlink data packets are identical, eliminates the replications of identical downlink data packets, and then sends the downlink data packets to (R)AN via N3 standard interface.

Figure 7:
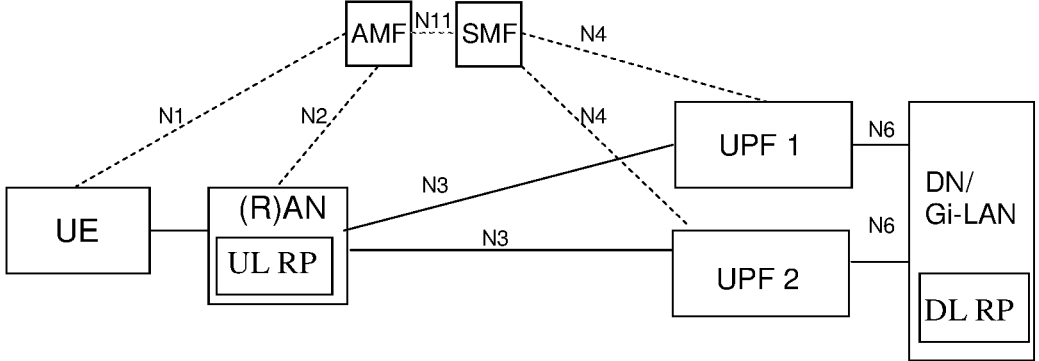
FIG. 7 illustrates a block diagram of an enhanced mobile network architecture to support redundant transmission according to some embodiments of the present disclosure.

FIG. 7 illustrates a block diagram of an enhanced mobile network architecture to support redundant transmission according to some embodiments of the present disclosure. In this embodiment, (R)AN acts as an UL RP entity/node in the mobile network architecture. In an implementation, the SMF decides to indicate (R)AN acting as UL RP entity/node during or after a PDU session establishment procedure.

In particular, for a QoS flow of a PDU session in URLLC slice, if an UPF 1 entity or a transmission link over N3 interface serving this QoS flow is already unreliable or is going to be unreliable, the SMF decides to add a redundant transmission node or entity for the UPF 1 entity. The SMF entity selects UPF 2 entity as a redundant node for the UPF 1 entity.

In response to UPF 1 having N3 interface with (R)AN, the (R)AN is indicated or instructed by the SMF entity as the UL RP entity. For the uplink traffic, The (R)AN acting as the UL RP entity replicates data packets from the UE and sends the replicated data packets to both the UPF 1 and UPF 2 entities respectively according to the UL RP function. For the downlink traffic, the (R)AN with UL RP function checks the downlink data packets, eliminates replications of the downlink data packets by merging duplicated downlink data packets, and sends the downlink data packets to the UE.

In this embodiment of FIG. 7, the DN which is supporting URLLC services considers the UPF 1 and UPF 2 entities as redundant transmission nodes, if the UPF 1 and UPF 2 entities correspond to the same UE and same PDU session. The DN is configured to perform DL RP function. The DN with the DL RP function eliminates the redundant data from the UPF 1 and UPF 2 entities. The DN with the DL RP function replicates the downlink data for this PDU session, and sends the replicated downlink data to both the UPF 1 and UPF 2 entities respectively. In an implementation, DL RP function is supported in the Gi-LAN, whereas the DN does not support the DL RP function.

According to some embodiments of the subject application, the SMF decides to add more than one redundant entities for the unreliable UPF. In this case, the SMF sends the CN Tunnel information related to all these selected redundant entities to the (R)AN with the UL RP function. The (R)AN with the UL RP function makes the replications based on the number of selected UPFs.

Figure 8:
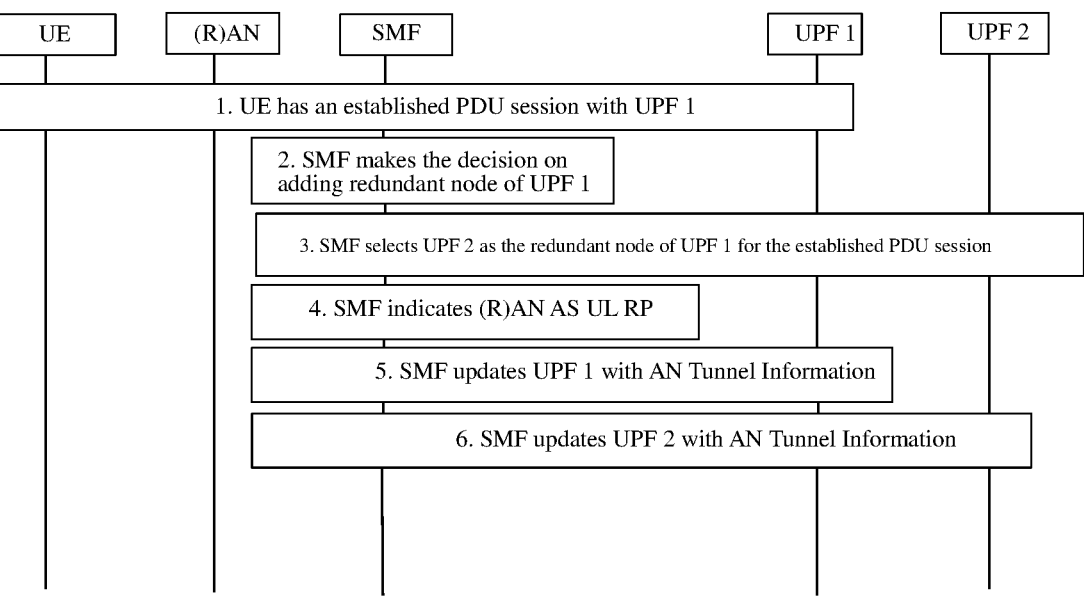
FIG. 8 illustrates a procedure for indicating an UL RP function on (R)AN according to some embodiments of the present disclosure.

The detailed procedure for (R)AN acting as UL RP after the PDU session establishment is shown in FIG. 8.

FIG. 8 illustrates a procedure for indicating UL RP function on (R)AN according to some embodiments of the present disclosure. This embodiment illustrates a procedure for indicating UL RP function on (R)AN after completing a PDU session establishment procedure.

Alternatively, a procedure for indicating UL RP function on (R)AN may be performed during a PDU session establishment procedure.

In the embodiment of FIG. 8, an UE has an established PDU session associated with URLLC services with an UPF 1 entity. The User Plane of this PDU session involves at least the (R)AN and UPF 1 entity. The UPF 1 entity communicates with (R)AN via N3 standard interface. In response to the UPF 1 entity being an unreliable node, the SMF entity decides to add a redundant node for the UPF 1 entity. The SMF entity selects an UPF 2 entity as the redundant node of the UPF 1 entity of the PDU Session.

The SMF entity indicates to (R)AN acting as UL RP entity/node via N2 SM information over N11 standard interface. The SMF entity provides CN Tunnel information related to the UPF 2 entity to the (R)AN. In addition, the AN Tunnel information related to the (R)AN is provided to UPF 2 entities. The SMF entity updates the UPF 2 entity via N4 standard interface. The (R)AN with the UL RP function replicates uplink data into two copies, and sends the two copies of uplink data to both the UPF 1 and UPF 2 entities. The (R)AN with the UL RP function eliminates the replication of downlink data from both the UPF 1 and UPF 2 entities.

Figure 9:
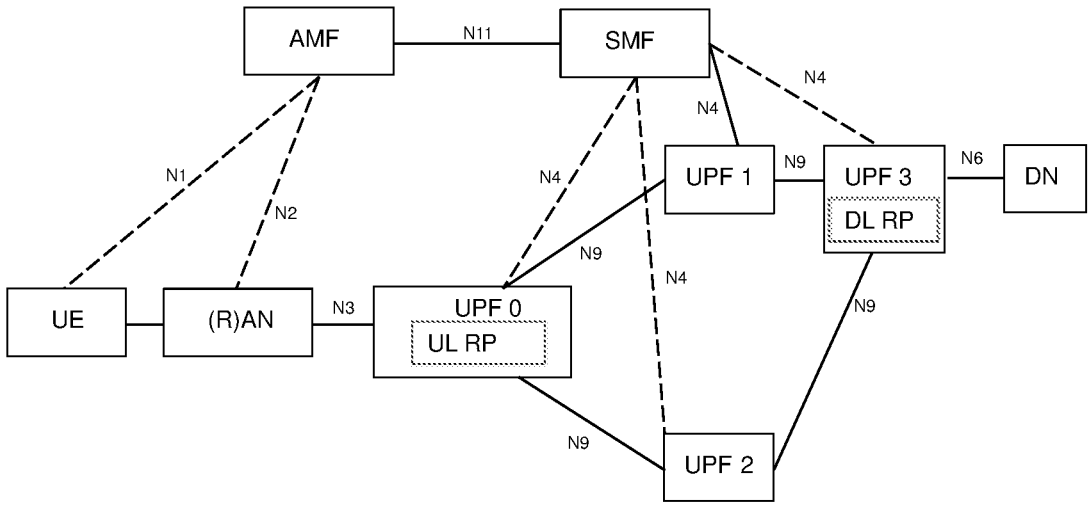
FIG. 9 illustrates a block diagram of an enhanced mobile network architecture to support redundant transmission according to a further embodiment of the present disclosure.

FIG. 9 illustrates a block diagram of an enhanced mobile network architecture to support redundant transmission according to a further embodiment of the present disclosure. In this embodiment, DL RP function is instructed or indicated to the UPF 3 entity. The redundant transmission links are converged at the UPF 3 entity.

In an implementation, the UPF 3 entity may be an UPF anchor, or an intermediate UPF between the unreliable UPF 1 and UPF anchor.

The embodiment of FIG. 9 may be implemented under two scenarios. In Scenario 1, an UPF 0 entity is added as the UL RP entity/node. In Scenario 2, the UPF 0 entity exists in the user plane before adding the redundant node for the UPF 1 entity.

In particular, under Scenario 1, when the UPF 1 entity is considered as an unreliable node, the SMF entity decides to add a redundant node for the UPF 1 entity and add an entity as UL RP node. The SMF entity selects UPF 2 as a redundant node for the UPF 1 entity. The SMF entity selects an UPF 0 entity as UL RP node, adds the UPF 0 entity in the User Plane of the PDU Session, and instructs UL RP function on the UPF 0 entity. The UPF 0 entity is connected to the UPF 2 and UPF 1 entities. For uplink traffic, the UPF 0 entity with the UL RP function replicates the uplink data, and sends the replicated downlink data to the UPF 2 and UPF 1 entities. For downlink traffic, the UPF 0 entity with the UL RP function eliminates redundant downlink data from the UPF 2 and UPF 1 entities, and sends the downlink data to the (R)AN.

If the User Plane of the PDU Session involves UPF 1 entity (which is identified as unreliable) and at least one UPF3 entity, the SMF entity instructs or indicates DL RP function on the UPF 3 entity. If the User Plane of the PDU Session does not involve UPF3 entity, the SMF entity may decide to add UPF 3 entity and then instructs DL RP function on the added the UPF 3 entity.

The UPF 2 and UPF 1 entities are connected to the UPF 3 entity. For uplink traffic, the UPF 3 entity with the DL RP function eliminates redundant data from the UPF 2 and UPF 1 entities, and sends the uplink data to DN. For downlink traffic, the UPF 3 entity with the DL RP function replicates the downlink data and sends the replicated downlink data to the UPF 2 and UPF 1 entities.

The SMF entity may send a redundant transmission rule(s) to the UPF 3 entity via N4 standard interface. The UPF 3 entity may eliminate redundant data for uplink traffic, and replicate the downlink data according to the received redundant transmission rule(s).

Under Scenario 2 of the embodiment of FIG. 9, when UPF 1 entity is considered as an unreliable node, or a data transmission link over N9 standard interface between UPF 1 and UPF 0 entities is considered as unreliable, the SMF entity decides to add a redundant node for the UPF 1 entity, and another link over N9 standard interface between an UL RP node and the redundant node for the UPF 1 entity. The UPF 0 entity exists in the user plane before adding the redundant node for the UPF 1 entity, and the SMF entity instructs or indicates UL RP function on the UPF 0 entity. If the User Plane of the PDU Session involves the UPF 1 entity (which is identified as unreliable) and at least one UPF3 entity, the SMF entity instructs or indicates DL RP function on the UPF 3 entity. If the User Plane of the PDU Session does not involve UPF3 entity, the SMF entity may decide to add UPF 3 entity and then instruct DL RP function on the added UPF 3 entity. The UPF 0 entity with the UL RP function and the UPF 3 entity with the DL RP function act in a similar way in Scenario 1 of the embodiment of FIG. 9.

FIG. 10 illustrates a block diagram of an enhanced mobile network architecture to support redundant transmission according to some embodiments of the present disclosure. In this embodiment, a data transmission link over N3 standard interface is between UPF 1 entity and (R)AN. The UL RP function is supported on the (R)AN. The DL RP function is supported on the UPF 3 entity, which serves the PDU session between UPF 1 entity and DN. The redundant transmission links are converged at the UPF 3 entity.

In response to the UPF 1 entity being considered as unreliable or a data transmission link over N3 standard interface between UPF 1 and (R)AN being considered as unreliable, the SMF entity decides to add a redundant node for the UPF 1 entity. The SMF entity selects UPF 2 entity as the redundant node for the UPF 1 entity, indicates (R)AN as UL RP entity/node, and adds another link over N3 standard interface between the (R)AN and the UPF 2 entity.

Similar to the embodiment of FIG. 9, if the User Plane of the PDU Session involves at least one UPF3 entity, the SMF entity instructs or indicates DL RP function on UPF 3 entity. If the User Plane of the PDU Session does not involve UPF3 entity, the SMF entity may decide to add UPF 3 entity and then instruct DL RP function on the added UPF 3 entity. The SMF may instruct or indicate the UPF 3 entity to support the DL RP function via N4 standard interface.

The (R)AN with the UL RP function and the UPF 3 entity with the DL RP function act in a similar way to the UPF 0 entity with the UL RP function and UPF 3 entity with the DL RP function in the embodiment of FIG. 9.

FIG. 11 illustrates a flowchart demonstrating a method of redundant transmission to support high data transmission reliability according to some embodiments of the present disclosure. In an implementation, the method in this embodiment is performed by a SMF entity.

In step 1101 of FIG. 11, adding a redundant entity for a first UPF entity is decided. In an example, the SMF entity decides to add a redundant entity for a first UPF entity. In step 1102 of FIG. 11, a second UPF entity is selected as the redundant entity of the first UPF entity. The second UPF entity may be selected during a PDU session establishment procedure or after completing a PDU session establishment procedure. In an implementation, the SMF entity selects a second UPF from multiple entities within a network as the redundant entity of the first UPF entity.

In step 1103 of FIG. 11, Downlink Replication (DL RP) function is indicated on a network entity or Data Network (DN). In an example, the network entity is an UPF entity. In a further example, the network entity is a Gi-LAN. In an implementation, the SMF entity instructs or indicates a network entity to perform DL RP function. In an implementation, the DN performs the DL RP function.

According to some embodiments of the present disclosure, the method of redundant transmission to support high data transmission reliability of FIG. 11 further comprises indicating UL RP function on another network entity. The another network entity may be an UPF entity, a (R)AN, or an UE.

All implementations and functions described above are applicable for the embodiment of FIG. 11.

According to some embodiments of the present disclosure, a redundant transmission link for a UPF entity (for example, UPF 1 entity) in a User Plane of a PDU Session may be released. In some implementations, a redundant entity for UPF 1 entity (for example, UPF 2 entity) is removed, an UL RP function is removed or deleted from a UL RP entity (for example, UPF 0 entity, or (R)AN), the redundant transmission rule(s) is disabled or deleted from the UL RP entity and a DL RP entity (for example, DN, Gi-LAN, or UPF 3 entity). Alternatively, in some implementations, the added UPF entity with the UL RP function is directly removed from the user plane serving the QoS flows of the UE. For example, implementations of releasing a redundant transmission link can be controlled by SMF entity.

According to some embodiments of the present disclosure, a redundant transmission link for a UPF entity (for example, UPF 1 entity) in a User Plane of a PDU Session may be modified. In some implementations, besides all steps of releasing the original redundant transmission link as described in the above paragraph of this specification, a new redundant entity for UPF 1 entity is selected and added to the user plane serving the QoS flow of the UE. Alternatively, a plurality of new redundant entities may be selected and added to the user plane serving the QoS flow of the UE. For example, the SMF entity selects one or more second UPF entities and adds these second UPF entities in the User Plane of the PDU Session, as new redundant entities of the first UPF entity.

According to some embodiments of the present disclosure, the method of modifying a redundant transmission link further comprises selecting and adding a new network entity to the user plane serving the QoS flow of the UE, and indicating the UL RP function on the new network entity. In an implementation, the method further comprises transmitting updated redundant transmission rule(s) to the network entity with the UL RP function.

According to some embodiments of the present disclosure, the implementations of modifying a redundant transmission link further comprise removing a DL RP function from a DL RP entity (for example, UPF 3 entity). For example, the SMF entity instructs or indicates to remove the DL RP function from the DL RP entity in the User Plane of the PDU Session.

In some implementations of modifying a redundant transmission link, after releasing the original redundant transmission link as described in the above paragraph of this specification, a new network entity (for example, UPF 3' entity) is selected and added to the mobile network architecture to act as new DL RP entity. In an implementation, the implementations of modifying a redundant transmission link may further comprise transmitting updated redundant transmission rule(s) to the DL RP entity.

FIG. 12 illustrates a block diagram of an apparatus according to some embodiments of the present disclosure, which can perform a method of redundant transmission to support high data transmission reliability. The apparatus 1200 may include a processor and a memory, wherein the processor is configured to perform the method according to any one embodiment described in above of the present disclosure. In some embodiments, the apparatus 1200 may further include an input device, a display, a memory, and/or other elements. In certain embodiments of the present disclosure, the processor may be, for example, a microcontroller, a microprocessor, a CPU, a GPU, an auxiliary processing unit, a FPGA, or the like.

In one embodiment, the processor in the apparatus 1200 is configured to decide to add a redundant entity for a first User Plane Function (UPF) entity, select a second UPF entity as the redundant entity of the first UPF entity, and indicate Uplink Replication (UL RP) function on a third network entity.

In some embodiments, the processor in the apparatus 1200 is configured to decide to add a redundant entity for a first User Plane Function (UPF) entity, select a second UPF entity as the redundant entity of the first UPF entity, and indicate Downlink Replication (DL RP) function on a third network entity.

In some embodiments, the processor in the apparatus 1200 is configured to decide to add a redundant entity for a first User Plane Function (UPF) entity, select a second UPF entity as the redundant entity of the first UPF entity, indicate Uplink Replication (UL RP) function on a third network entity, and indicate Downlink Replication (DL RP) function on a fourth network entity.

In some embodiments, the processor in the apparatus 1200 is configured to decide to modify a redundant transmission link for a first User Plane Function (UPF) entity, and remove Uplink Replication (UL RP) function from a third network entity.

The functions and implementations of all elements in the apparatus 1200 and definitions of related technical terms can refer to the specific descriptions of FIGS. 1-11 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

What is claimed:

1. A method performed by a set of network functions, the method comprising:

receiving, from a session management function (SMF), configuration information associated with duplication data packets, wherein the configuration information identifies at least one uplink replication entity and one downlink replication entity and includes redundant transmission rules that specify at least a quantity of duplicated data packets, a quality-of-service (QOS) flow requiring redundancy, and a validity duration for redundancy;

transmitting routing information for a first transmission tunnel and a second transmission tunnel, the first transmission tunnel and the second transmission tunnel are associated with a single packet data unit session;

receiving a single uplink data packet;

replicating the single uplink data packet in accordance with the redundant transmission rules to create an uplink set of duplicated data packets;

transmitting the uplink set of duplicated data packets, wherein each data packet of the uplink set of duplicated data packets is transmitted on the first transmission tunnel and on the second transmission tunnel;

receiving a downlink set of duplicated data packets; and eliminating, based on the redundant transmission rules, duplicated data packets in the downlink set of duplicated data packets between the set of network functions and user plane functions (UPF) s so that a single downlink data packet is transmitted to a user equipment (UE).

2. The method of claim 1, wherein a first data packet of the uplink set of duplicated data packets is transmitted over the first transmission tunnel and a second data packet of the uplink set of duplicated data packets is transmitted over the second transmission tunnel different from the first transmission tunnel.

3. The method of claim 2, wherein the first transmission tunnel is a first N3 tunnel and the second transmission tunnel is a second N3 tunnel.

4. The method of claim 1, further comprising transmitting routing information corresponding to the first transmission tunnel and the second transmission tunnel.

5. The method of claim 1, wherein the configuration information is received from the SMF.

6. An apparatus comprising a set of network functions, the apparatus comprising:

at least one memory; and at least one processor coupled with the at least one memory and configured to cause the apparatus to:

receive, from a session management function (SMF), configuration information associated with duplication data packets, wherein the configuration information identifies at least one uplink replication entity and one downlink replication entity and includes redundant transmission rules that specify at least a quantity of duplicated data packets, a quality-of-service (QOS) flow requiring redundancy, and a validity duration for redundancy;

transmit routing information for a first transmission tunnel and a second transmission tunnel, the first transmission tunnel and the second transmission tunnel are associated with a single packet data unit session;

receive an uplink data packet;

replicate the uplink data packet in accordance with the redundant transmission rules to create an uplink set of duplicated data packets;

transmit the uplink set of duplicated data packets, wherein each data packet of the uplink of duplicated data packets is transmitted on the first transmission tunnel and on the second transmission tunnel;

transmit routing information corresponding to the first transmission tunnel and the second transmission tunnel;

receive a downlink set of duplicated data packets; and eliminate, based on the redundant transmission rules, duplicated data packets in the downlink set of duplicated data packets between the set of network functions and user plane functions (UPF) s so that a single downlink data packet is transmitted to a user equipment (UE).

7. The apparatus of claim 6, wherein a first data packet of the uplink set of duplicated data packets is transmitted over the first transmission tunnel and a second data packet of the uplink set of duplicated data packets is transmitted over the second transmission tunnel different from the first transmission tunnel.

8. The apparatus of claim 7, wherein the first transmission tunnel is a first N3 tunnel and the second transmission tunnel is a second N3 tunnel.

9. The apparatus of claim 6, wherein the configuration information is received from the SMF.

10. A method performed by one or more network functions, a network function of the one or more network functions comprising a user plane function (UPF), the method comprising:

receiving, at the UPF from a session management function (SMF), configuration information associated with duplication data packets, wherein the configuration information identifies the UPF as a downlink replication entity and includes redundant transmission rules specifying at least a quality-of-service (QOS) flow requiring redundancy, a duplication count, and a time-based validity;

transmitting routing information for a first transmission tunnel and a second transmission tunnel, the first transmission tunnel and the second transmission tunnel are associated with a single packet data unit session;

receiving, at the UPF, a downlink data packet associated with the QoS flow;

replicating, based on the redundant transmission rules, the downlink data packet to form a downlink set of duplicated data packets; and transmitting the downlink set of duplicated data packets for the downlink data packet on the first and second transmission tunnels.

11. The method of claim 10, wherein a first data packet of the downlink set of duplicated data packets is transmitted over the first transmission tunnel and a second data packet of the downlink set of duplicated data packets is transmitted over the second transmission tunnel different from the first transmission tunnel.

12. The method of claim 11, wherein the first transmission tunnel is a first N3 tunnel and the second transmission tunnel is a second N3 tunnel.

13. The method of claim 10, further comprising transmitting routing information corresponding to the first transmission tunnel and the second transmission tunnel.

14. The method of claim 10, further comprising receiving an uplink set of duplicated data packets.

15. The method of claim 14, further comprising eliminating duplicated data packets in the uplink set of duplicated data packets between a radio access node and UPFs.

16. An apparatus comprising one or more network functions, a network function of the one or more network functions comprising a user plane function (UPF), the apparatus comprising:

at least one memory; and at least one processor coupled with the at least one memory and configured to cause the apparatus to:

receive, at the UPF from a session management function (SMF), configuration information associated with duplication data packets, wherein the configuration information identifies the UPF as a downlink replication entity and includes redundant transmission rules specifying at least a quality-of-service (QOS) flow requiring redundancy, a duplication count, and a time-based validity;

transmit routing information for a first transmission tunnel and a second transmission tunnel, the first transmission tunnel and the second transmission tunnel are associated with a single packet data unit session;

receive, at the UPF, a downlink data packet associated with the QoS flow;

replicate, based on the redundant transmission rules, the downlink data packet to form a downlink set of duplicated data packets; and transmit the downlink set of duplicated data packets for the downlink data packet on the first and second transmission tunnels.

* * * * *